(12) United States Patent
Leka

(10) Patent No.: US 11,977,584 B2
(45) Date of Patent: May 7, 2024

(54) SYSTEM AND METHOD OF CORRELATING MULTIPLE DATA POINTS TO CREATE A NEW SINGLE DATA POINT

(71) Applicant: Jumptuit, Inc., New York, NY (US)

(72) Inventor: Donald Leka, New York, NY (US)

(73) Assignee: Jumptuit, Inc., New York, NY (US)

( * ) Notice: Subject to any disclaimer, the term of this patent is extended or adjusted under 35 U.S.C. 154(b) by 204 days.

(21) Appl. No.: 15/950,866

(22) Filed: Apr. 11, 2018

(65) Prior Publication Data
US 2019/0318043 A1    Oct. 17, 2019

(51) Int. Cl.
| | | |
|---|---|---|
| G06F 7/00 | (2006.01) | |
| G06F 16/00 | (2019.01) | |
| G06F 16/27 | (2019.01) | |
| G06F 16/907 | (2019.01) | |
| G06F 16/951 | (2019.01) | |
| H04L 9/40 | (2022.01) | |

(52) U.S. Cl.
CPC ............ *G06F 16/907* (2019.01); *G06F 16/27* (2019.01); *G06F 16/951* (2019.01); *H04L 63/0428* (2013.01)

(58) Field of Classification Search
None
See application file for complete search history.

(56) References Cited

U.S. PATENT DOCUMENTS

| | | |
|---|---|---|
| 7,287,214 B1 | 10/2007 | Jenkins et al. |
| 2002/0138377 A1 | 9/2002 | Weber |
| 2005/0165795 A1* | 7/2005 | Myka ................ G06Q 10/1095 |
| 2009/0177685 A1 | 7/2009 | Ellis et al. |
| 2012/0209625 A1 | 8/2012 | Armstrong et al. |
| 2012/0233000 A1* | 9/2012 | Fisher ..................... G06F 16/58 705/14.71 |
| 2014/0095521 A1 | 4/2014 | Blount et al. |
| 2014/0201126 A1 | 7/2014 | Zadeh et al. |
| 2014/0222451 A1 | 8/2014 | Hall et al. |
| 2014/0222560 A1* | 8/2014 | Kota ................. G06Q 30/0255 705/14.53 |
| 2015/0113019 A1 | 4/2015 | Jiang et al. |
| 2015/0154360 A1 | 6/2015 | Aziz et al. |
| 2015/0312259 A1 | 10/2015 | Alpha et al. |
| 2016/0286244 A1* | 9/2016 | Chang ................ H04N 21/4788 |
| 2016/0354039 A1 | 12/2016 | Soto et al. |

(Continued)

OTHER PUBLICATIONS

Office Action issued for U.S. Appl. No. 15/950,922, dated Dec. 30, 2019, 14 pages.

(Continued)

*Primary Examiner* — Tuan A Pham
(74) *Attorney, Agent, or Firm* — Sprinkle IP Law Group

(57) ABSTRACT

A system designed with a scanning engine, storage, analysis engine, search engine, security exchange, and display engine. The system performs data reticulation using the scanning engine to access a first piece of data stored at a first location and a second piece of data stored at a second location. The scanning engine further retrieves from the first and second pieces of data first and second metadata, related respectively. The analysis engine creates the correlated metadata based on the first and second metadata. An example of the correlated metadata contains information not present in the first metadata and the second metadata.

16 Claims, 11 Drawing Sheets

(56) References Cited

U.S. PATENT DOCUMENTS

| | | | | |
|---|---|---|---|---|
| 2017/0116285 | A1* | 4/2017 | Dotan-Cohen | G06F 16/335 |
| 2017/0155631 | A1 | 6/2017 | Du | |
| 2017/0193588 | A1* | 7/2017 | Loui | G06F 16/583 |
| 2017/0332231 | A1* | 11/2017 | Hamilton | H04L 9/3247 |
| 2018/0054491 | A1 | 2/2018 | Mankovskii et al. | |
| 2018/0060659 | A1* | 3/2018 | He | G06K 9/00255 |
| 2018/0082120 | A1* | 3/2018 | Verdejo | G06K 9/00577 |
| 2018/0255267 | A1* | 9/2018 | Ido | H04N 5/77 |
| 2019/0065614 | A1 | 2/2019 | Bilsten | |
| 2019/0318044 | A1 | 10/2019 | Leka | |

OTHER PUBLICATIONS

Office Action issued for U.S. Appl. No. 15/950,922, dated Sep. 29, 2022, 17 pages.

Notice of Allowance issued for U.S. Appl. No. 15/950,922, dated Jun. 15, 2023, 9 pages.

International Search Report and Written Opinion issued for International Application No. PCT/US2019/026899, dated Jun. 26, 2019, 3 pages.

Sihvonen et al., "Subject Knowledge, Thesaurus-assisted Query Expansion and Search Success," Proceeding RIAO '04 Coupling approaches, coupling media and coupling languages for information retrieval, Apr. 26, 2004, pp. 393-404.

Yee et al., "Faceted Metadata for Image Search and Browsing," Proceedings of the SIGHI Conference on Human Factors in Computing Systems, Apr. 10, 2003, 8 pages.

Metz, Cade, AI is the Transforming Google Search. The rest of the Web is Next, Wired Magazine, Feb. 4, 2016, 14 pages.

International Preliminary Report on Patentability and Written Opinion issued for International Application No. PCT/US2019/026899, dated Oct. 13, 2020, 6 pages.

International Search Report and Written Opinion issued for International Application No. PCT/US2019/026998, dated Jun. 9, 2019, 8 pages.

International Preliminary Report on Patentability and Written Opinion issued for International Application No. PCT/US2019/026998, dated Oct. 13, 2020, 7 pages.

Notice of Allowance issued for U.S. Appl. No. 15/950,922, mailed Dec. 13, 2023, 10 pages.

* cited by examiner

SYSTEM AND METHOD OF CORRELATING MULTIPLE DATA POINTS TO CREATE A NEW SINGLE DATA POINT

FIELD OF THE INVENTION

The present invention relates to receiving multiple data points, relating them and generating a new data point that is a corollary to the multiple points.

BACKGROUND

Human and machine generated metadata is exponentially increasing and fragmenting across an expanding universe of cloud services and Internet of Things (IoT) devices. The average person actively uses 27 apps that rely on cloud-based services in their personal lives, a combination of 36 personal and enterprise cloud services for work, owns 4 connected devices (e.g. smart phone, tablet, PC and smart TV) and uses additional devices for work. The average organization uses 1,427 cloud services across its employees including 210 collaboration services (e.g. Office 365, Slack), 76 file sharing services (e.g. Box, OneDrive), 56 content sharing services (e.g. YouTube, Flickr) and 41 social media services (e.g. Facebook, LinkedIn) and generates over 2.7 billion unique transactions each month (e.g. user logins, uploads, edits).

This proliferation of cloud services and IoT devices has accelerated the volume of data generated by consumers and organizations to 23 billion gigabytes per day. As some examples:

| Data Generated | Per Minute | Per Day |
| --- | --- | --- |
| Dropbox Files Uploaded | 833 thousand | 1.2 billion |
| Email Sent/Received | 150 million | 215 billion |
| Facebook Posts Shared | 3 million | 4.3 billion |
| Facebook Posts Liked | 4 million | 5.8 billion |
| Instagram Posts Liked | 2.5 million | 3.6 billion |
| Twitter Tweets Posted | 350 thousand | 504 million |
| YouTube Minutes of Video Uploaded | 18 thousand | 25.9 million |

This pervasive and growing problem of data fragmentation across cloud services and IoT platforms affects consumers and organizations alike. As an example of a real word situation a user is headed to a meeting and remembers a data point that is needed for the meeting. However, the user cannot remember where or when she last saw it. Email? Cloud drive? File sharing? Chat? Social media? The only feature the user can remember that the info is about travel trends, and that there's a picture of a smiling woman and a palm tree. Currently, the user has to search for the data individually across all her known digital connections. This increases time lost and increases the probability that the data cannot be found timely. What is needed is a means to quickly retrieve and act on data across a broad spectrum of cloud services and IoT platforms.

SUMMARY

The present invention solves the above problems using a system designed with a scanning engine, storage, analysis engine, search engine, security exchange, and display engine. The system performs data reticulation using the scanning engine to access a first piece of data stored at a first location and a second piece of data stored at a second location. The scanning engine further retrieves from the first and second pieces of data first and second metadata, related respectively. The analysis engine creates the correlated metadata based on the first and second metadata. An example of the correlated metadata contains information not present in the first metadata and the second metadata.

The scanning engine is configured to access, over a network, a first piece of data stored at a first location and a second piece of data stored at a second location and retrieve, from the first and second pieces of data, a first metadata related to the first piece of data, and a second metadata related to the second piece of data. The analysis engine implements at least one algorithm to generate a correlated metadata based on the first metadata and the second metadata. The correlated metadata can include information not present in the first metadata and the second metadata and the information is based on an analysis of the first metadata and the second metadata.

The system can have, in certain examples, non-transient memory storing the first metadata and the second metadata, either before or after generating the correlated metadata with the analysis engine, and storing the correlated metadata. The non-transient memory can be separate from the first location and the second location.

The search engine can be, in certain examples, configured to receive, from a user, an inquiry related to at least one of the first and second pieces of data and analyze the correlated metadata to determine a response to the inquiry. It can send to a destination (chosen by the user), based on the response, at least one of the data from the disparate locations or links to the data.

The security exchange can encrypt the data prior to sending to the destination and decrypt the data once delivered to the destination. Separate from the encryption, it can also append to a blockchain a record of the delivery to the destination. The display engine can transcode the data either prior to the destination or once delivered to the destination, to permit the destination to access the data in a compatible file format.

The search engine can further formulate, based on the analysis, an independent inquiry to an independent search engine (like Alexa or Siri) and acquire, from the independent search engine, an independent search result related to the independent inquiry. The independent search result can be sent along with the data in the result.

The system is designed to implement a number of methods using processors and algorithms. The scanning engine can access, in some examples for an individual user, over the network, a first piece of data stored at a first location and a second piece of data stored at a second location. The scanning engine further retrieves from the first and second pieces of data, a first metadata and second metadata, related respectively. The analysis engine creates the correlated metadata based on the first metadata and the second metadata. An example of the correlated metadata contains information not present in the first metadata and the second metadata and the information is based on an analysis of the first metadata and the second metadata. In this instance, "not present" is excluding any information already present in the metadata and any formalities that do not require analysis, like a time and date stamp.

The metadata can encompass service metadata, user metadata, and personalized metadata. The service and user metadata are appended to the data. In certain examples, the service and user metadata are all the system uses for the analysis. However, in other examples, the scanning engine can scan the first piece of data to generate a first original metadata and scan the second data to generate a second original metadata. The metadata can be stored in memory, which in this example is separate from the first location and the second location. Alternately, just the original metadata can be used for correlation.

The search engine can receive from the user, an inquiry related to at least one of the first and second pieces of data. The analysis engine can analyze, using a processor running instructions to implement at least one algorithm, the correlated metadata to determine a response to the inquiry. The search engine and/or the display engine can send to a destination, based on the response, the first and/or second piece of data from where they were stored or send a first and/or second link to the respective data. The destination above can be any "location" the user specifies. It can be to move the data from one device or service to another, send the data to the device the user is currently using, or transmit the data to a third person via file transfer, email, text, etc.

In other examples, the security exchange can encrypt the data prior to sending it to the destination and then decrypt it once delivered to the destination. One example of decryption is that the security exchange performs the decryption at the destination so the file is unencrypted at the destination without the recipient taking action. In an alternate example, the "decryption" is a follow-on communication that allows the recipient to decrypt the data when wanted.

Another feature that can be used both with and without the encryption is tracking the data with blockchain technology. The security exchange can append to a blockchain a record of the data being sent. Other examples of the display engine can transcode the data, either prior to the destination or once delivered to the destination, to permit the destination to access the data. This allows data in multiple formats to be delivered in a uniform format or have their format changed to permit access on the device the data is delivered to.

In other examples, the search engine and/or the analysis engine can, while determining the answer based on the correlated metadata, formulate an independent inquiry to an independent search engine and then acquire from the independent search engine an independent search result related to the independent inquiry. Then, when sending the data to the destination, the independent search result can be sent along with the data.

BRIEF DESCRIPTION OF THE DRAWINGS

This invention is described with particularity in the appended claims. The above and further aspects of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

The drawing figures depict one or more implementations in accord with the present teachings, by way of example only, not by way of limitation. In the figures, like reference numerals refer to the same or similar elements.

DETAILED DESCRIPTION

Figure 1:
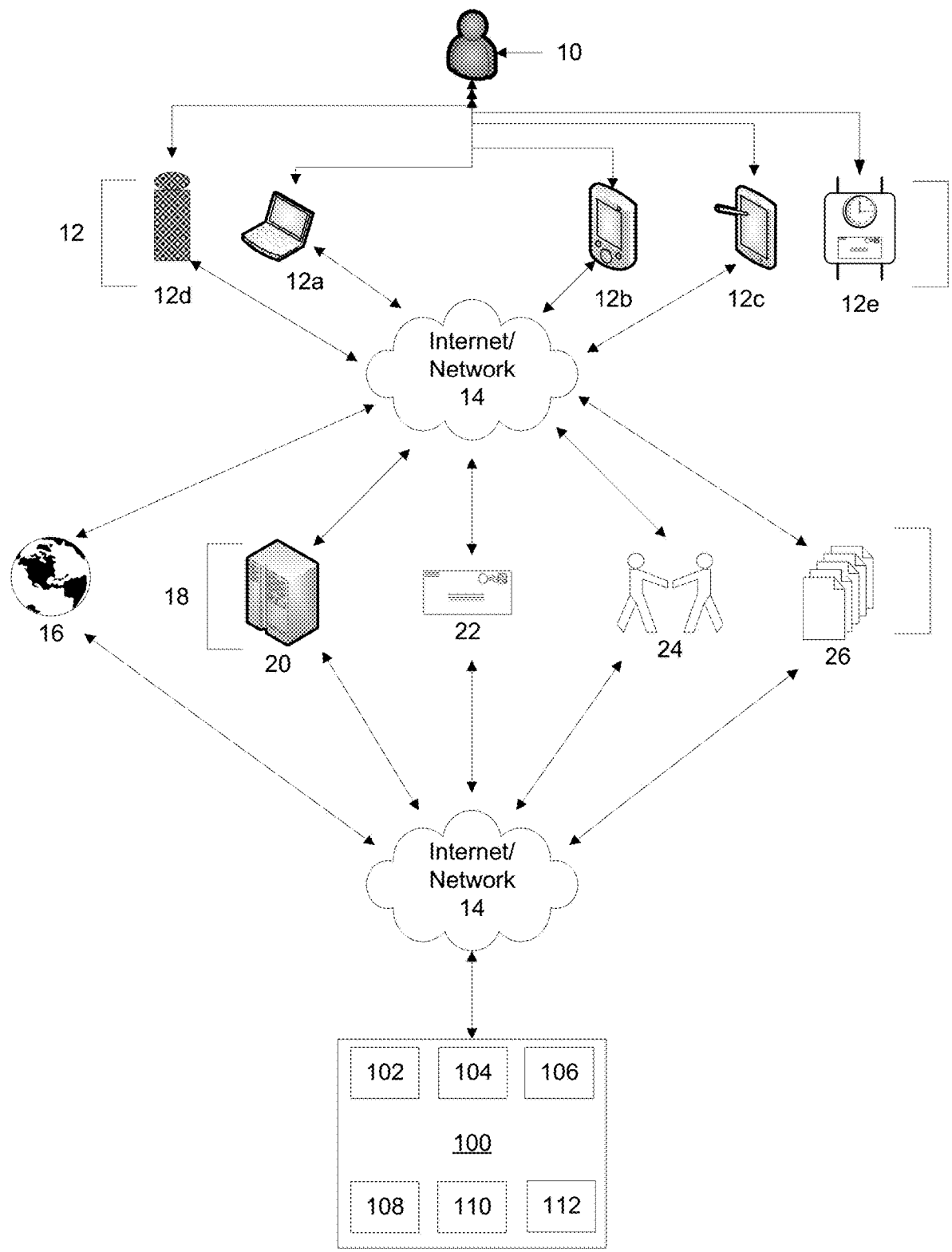
FIG. 1 is a schematic overview of the system of the present invention.

Turning to FIG. 1, an overview of the system 100 is illustrated. A user 10 can have any number of internet connect devices 12, including a laptop 12a, a smartphone 12b, a tablet 12c, a smart speaker 12d, an internet connected watch/wearable (12e), smart car (not illustrated), smart appliance (not illustrated), smart TV (not illustrated), and all other networked content creation and delivery devices. The user 10 can interact with the devices which in turn are connected to the internet 14 or other networks: public, private, or worldwide. These connections allow the user to access content 16 broadly or utilize any number of services 18, including file storage 20, email servers 22, social media 24, and collaboration and content sharing 26, calendar (not illustrated), and gaming platforms (not illustrated), as just an example of the myriad of on-line services and accounts available to the user 10. The user 10 then can permit the system 100 to access her content 16 and services 18 to begin the process of data reticulation.

An example of the system 100, the user 10 information and profile can be stored anonymously. Even though the user 10 allows the system to access her accounts 16, 18, the system 100 itself does not request or store personal information, for example, name, physical address, credit card information, etc. In one example, the personal information is never collected from the user 10. Each user 10 is identified only with a pseudonym alphanumeric string. Each of the services 18 individually can link the user's 10 services account with the pseudonymized system account, but the system 100 itself does not store that information. Further, the service 100 may not store access passwords or user names to access the services 18. Once the user 10 grants access, the applications maintain the link without passwords. Alternately, if the user 10 is asked to provide personal information to the system 100, each user's 10 personal data can undergo pseudonymisation so it is not provided throughout the system 100 or needs to be decoded to determine the true identity of the user 10. This level of user 10 privacy can reduce the impact of a personal information breach. If personal data is not stored or easily linked to a particular user 10, any release of the personal information has minimal impact in the user 10. This also leads to less hacking attempts, as the would-be hackers cannot capitalize on any of the personal information collected.

Figure 2:
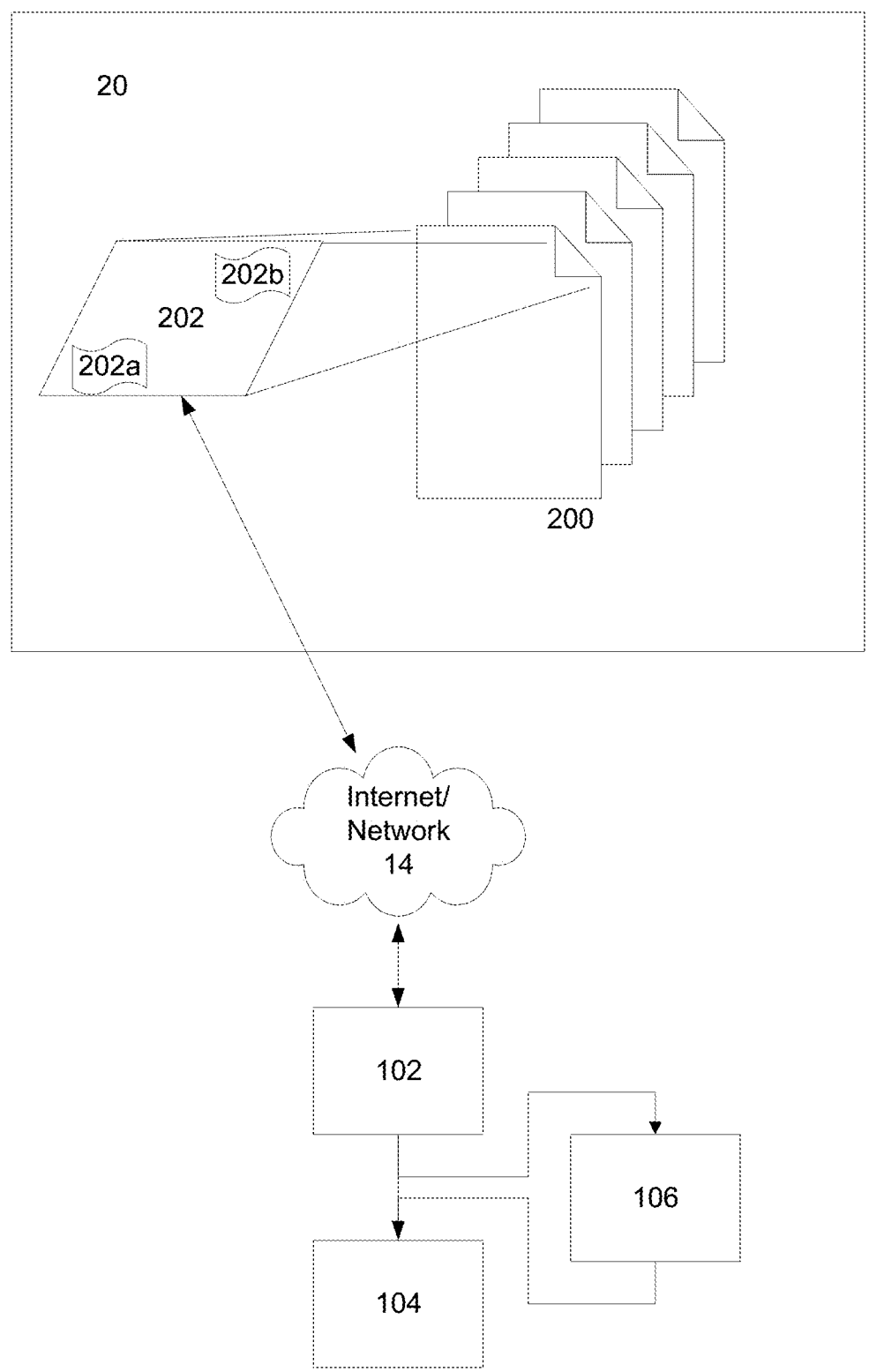
FIG. 2 illustrates an example of the data reticulation process.

The system 100 can have a scanning engine 102, storage 104, analysis engine 106, search engine 108, security exchange 110, and display engine 112. FIG. 2 is an example of the system 100 that performs the data reticulation process. In an example of a first instance, the scanning engine 102 scans all of the information associated with the user's devices 12, content 16, and services 18. As is known in the art, all or most individual pieces of data 200 have metadata 202 attached. The metadata 202 describes and provides information about the data 200 without needing to access the data 200 itself. The metadata 200 can include metadata 202*a* added by the individual services 18 in addition to user generated metadata 202*b*. In one example, the scanning engine 102 can just extract the metadata 202 associated with each piece of data 200 and store the metadata 202 in the memory 104.

As a concrete example, the user 10 can store a Word document 200 in her DropBox account 20. The Word document has the user generated metadata 202*b* attached to it, which can include author, creation date, and store a number of changes made by the user 10 during the creation of the document. DropBox 20 can also add metadata 202*a* regarding the time and number of uploads, downloads, etc. The scanning engine 102 can just extract that metadata 202 without accessing the document 200. The scanning engine 102 then stores the metadata 202 for further use, described below.

Figure 3:
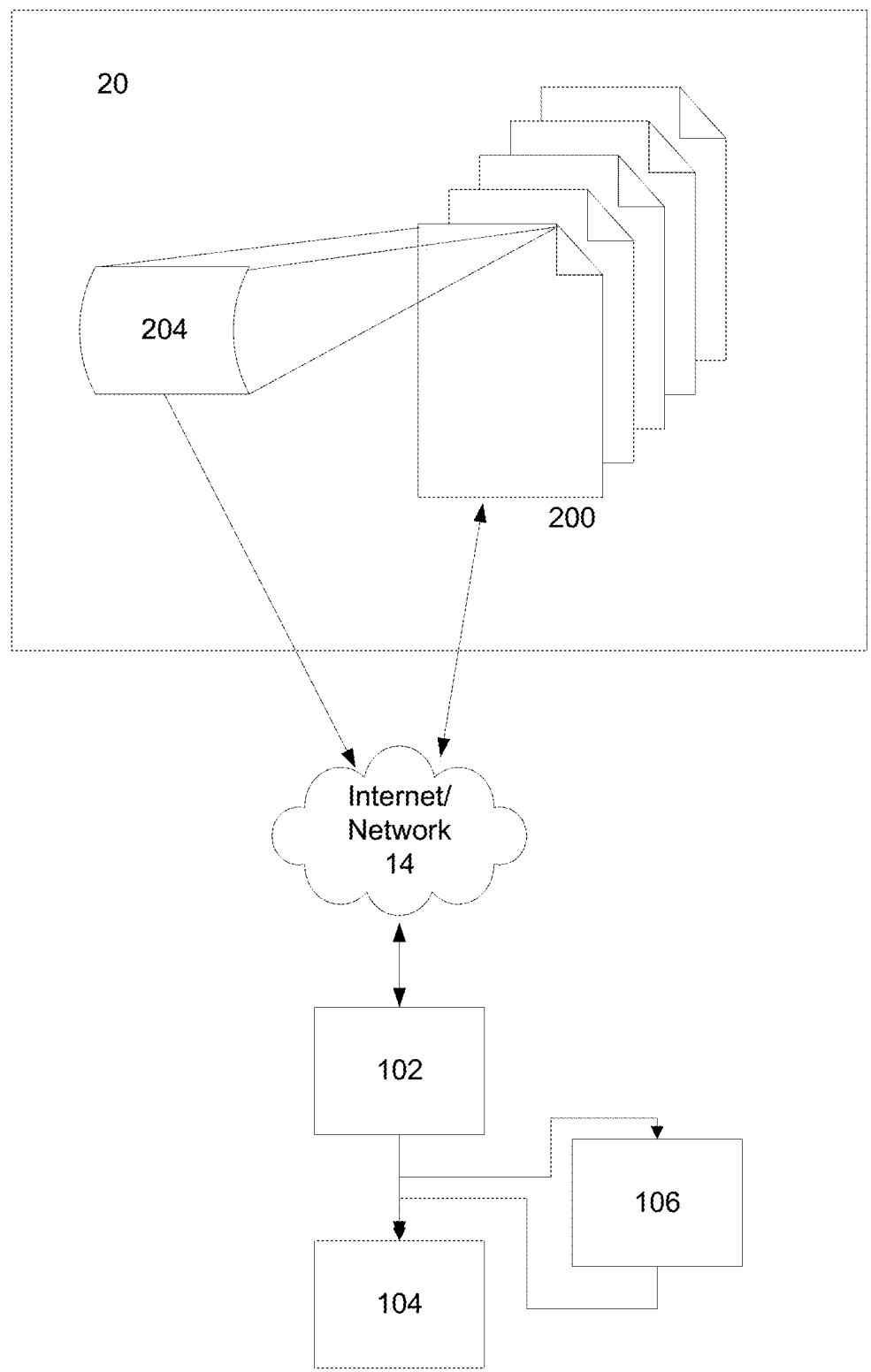
FIG. 3 illustrates another example of the data reticulation process.

Another example of the scanning engine 102 can be that the scanning engine 102 takes each piece of data 200 and creates new metadata 204 based on its own scanning and processing algorithm. FIG. 3 illustrates that the scanning engine 102 accesses each piece of data 200, performs a scan, and then creates the new metadata 204. The new metadata 204 is then stored in memory 104. In this example, extended from the one above, the scanning engine 102 reads the Word document 200 and can capture additional information (i.e. addresses and addressees of correspondence, main themes, etc.) and then creates the new metadata 204 from the read.

A further example can allow the scanning engine 102 to both read the existing metadata 202 and acquire the new metadata 204. The two metadata 202, 204 can be combined or stored separately in memory 104. Additionally, both examples above allow the data 200 to remain stored at the service 18 or device 12 and only the metadata 202, 204 is stored in the memory 104 of the system 100. In alternate examples, all of the data 200 can be redundantly backed up and stored in the memory 104 as well.

As the data 200 is being scanned by the scanning engine 102 and metadata 202, 204 stored in memory 104, the analysis engine 106 reviews the metadata 202, 204 and creates additional correlated data points 206 relating the data 200. The correlated data points 206 can be generated from a combination of metadata 202, 204 and interpreting the information therein.

Figure 4:
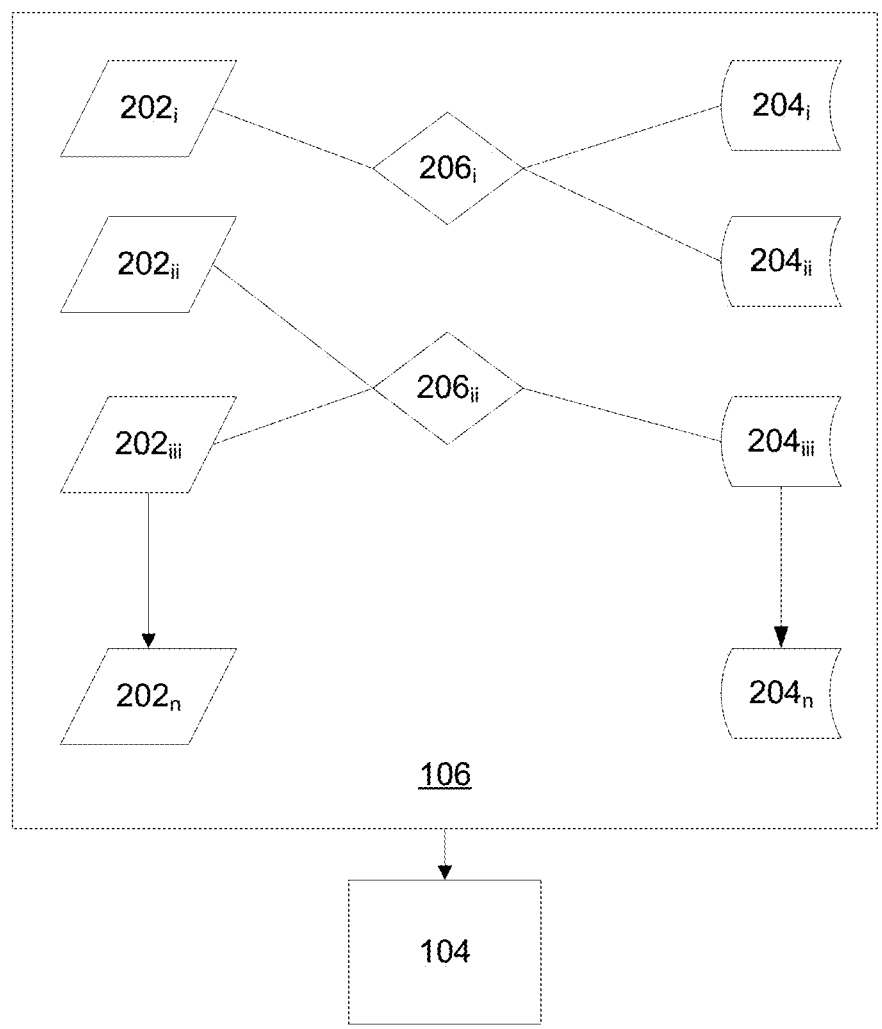
FIG. 4 illustrates an example of a conversion from metadata to correlated metadata.

FIG. 4 illustrates an example of the analysis engine 106 generating a new correlated data point or correlated metadata 206. Memory 104 stores the vast number of metadata $202_i$, $202_{ii}$, $202_{iii} \rightarrow 202_n$ and new metadata $204_i$, $204_{ii}$, $204_{iii} \rightarrow 204_n$ and passes it along to the analysis engine 106. In an alternate example, the scanning engine 102 can pass all of the metadata 202, 204 through the analysis engine 106 before storage 104. The analysis engine 106 analyzes the metadata 202, 204 and finds correlations between what may be disparate and unrelated data points 200 and saves that information as correlated metadata 206.

For example, the user 10 could have taken a trip to Italy and there are photos taken during the trip on one or more of the user's devices 12 and/or uploaded to the user's photo storage 20 and social media accounts 24. Further, there are calendar entries detailing where the user 10 is on a particular day and a Word diary of the trip. The analysis engine 106 can use the date and geotagging information in the photos to determine location. Image recognition analysis can be performed on the images to extract additional details and all of this can be compared against the calendar and diary entries for increased accuracy. Correlated metadata 206 can be created linking all of the original data 200 and additional details can also be extracted and correlated to data points 206 related to the user's likes and dislikes.

Thus, in one example, user metadata $202_i$ and new metadata $204_i$, $204_{ii}$ can be used to link a photo, calendar, and diary entry to detail that the user 10 met a particular person at a particular place and time, and ate a meal. Thus, the correlated metadata $206_i$ can link a picture of the Trevi Fountain, a calendar entry to meet Robert Langdon, and ate at the Il Gelato de San Crispino in Rome. In a deeper correlation, from, for example, the photos and diary $202_{ii}$, $202_{iii}$, $204_{iii}$ it can be determined that pistachio is the user's 10 favorite gelato and Mr. Langdon was wearing a tweed jacket and that correlated metadata $206_{ii}$ can also be saved 104.

The scanning, analysis and storage of correlated metadata 206 allows for a much more robust search with the search engine 208. The search engine 108 can receive user input in any form, including text and voice, to search the user's 10 data 200. The search can be general, specific, and/or somewhat free form. By using the correlated metadata 206 a user can ask for "when was I at Trevi Fountain", "who did I meet at Trevi Fountain", and/or "what was my favorite gelato flavor"? Because the correlated metadata 206 can link back the original metadata 202, 204, the original data 200 can be produced if a subsequent search query requests it. The search engine 108 can also create links or attachments for the data 200 requested.

Figure 5:
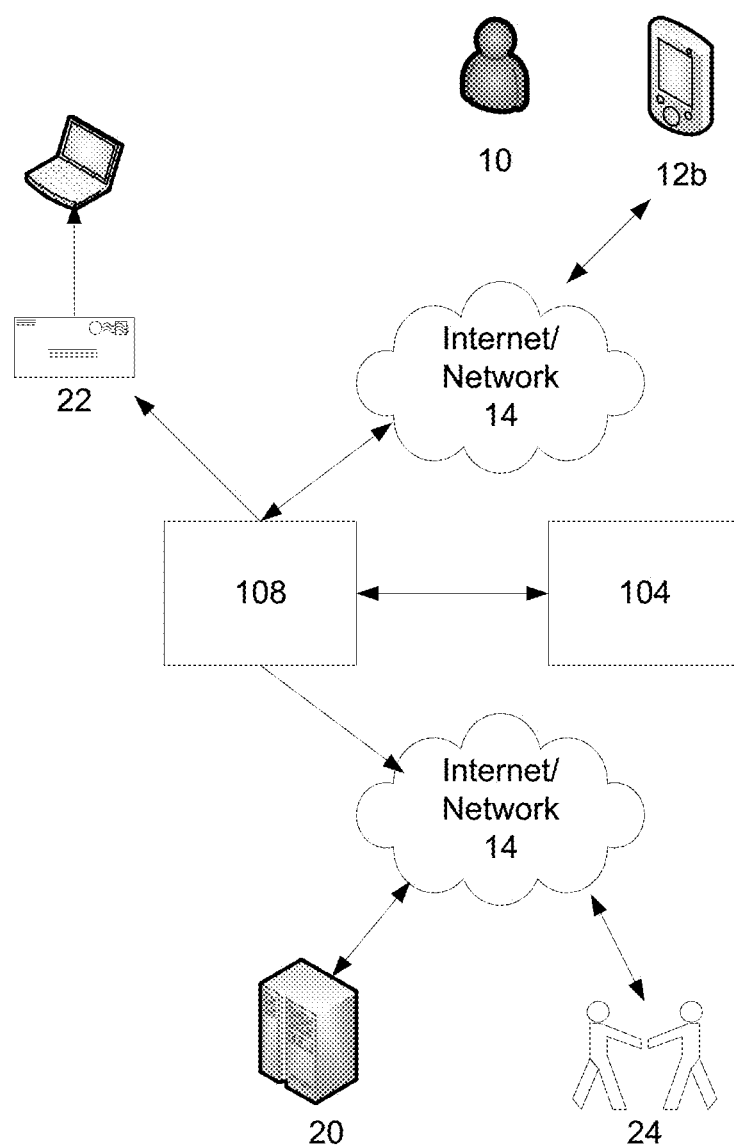
FIG. 5 illustrates an example of the search engine.

FIG. 5 illustrates the search as detailed above looking for the single data point. The user 10 queries the system 100, by voice on her smartphone 12*a* "I am looking for a picture of a smiling woman and a palm tree with text involving travel." The search engine 108 now searches the correlated metadata 206 in the memory 104 to find the answer to the question. The search engine 108 determines the possible answers to the question and additionally determines that one possible answer resides in the user's file storage 20 and the other resides in the user's social media account 24. The search engine 108 can then reply to the user 10 either with copies of the data 200 from both locations 20, 24 or links to those locations/data. The user 10 can further request the search engine 108 to e-mail the data to a third party. The search engine 108 can access the users e-mail account 22 and contacts to create a new e-mail with attachments and ask the user 10 to dictate the accompanying text.

Turning now to the access and movement of the data 200. The system 100 can utilize the security exchange 110 to encrypt and track the movement of any or all data 200 passing through the system 100. One example of the security exchange 110 can be the encryption of correlated metadata 206 "at rest" i.e. when stored in memory 104. Thus, even if a hacker gained access to the system storage 104, the correlated metadata 206 is still inaccessible. Further, while the data 200 may not be encrypted where stored on the user's device 12 or service 18, the security exchange 110 can encrypt any data 200 it moves or sends in response to a user query.

Figure 6:
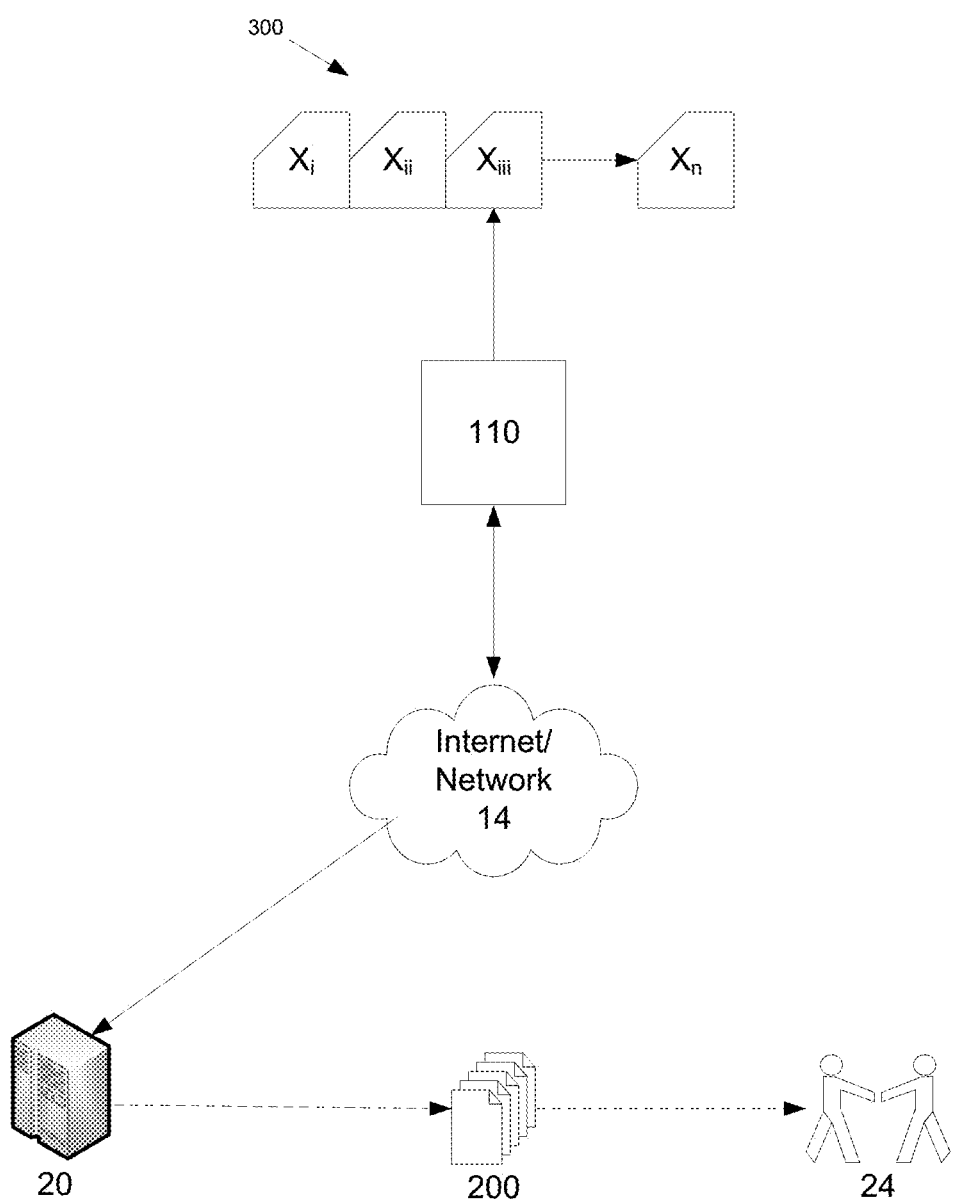
FIG. 6 illustrates an example of the security exchange.

In addition, to verify the data 200 being exchanged and to provide the user 10 a log of all system 100 transactions, all data 200 movements can be recorded in a blockchain. Additionally, the user 10 can request that any movement of data 200, be recorded in a blockchain. The security exchange 110 directly connects the devices 12 and services 18 so the data 200 passes through the exchange 100 for a direct connection between services 18. FIG. 6 illustrates an example of data movement. The user 10 asks the service 100 to move data 200 from her file storage 20 to her social media account 24, for example, a picture from her recent trip to Italy. The system 100 accesses the file storage 20 account, encrypts the data 200 and sends it to the social media site 24 where the data 200 is decrypted for use. At the same time, the security exchange 110 appends to the blockchain 300 a record of the transaction $X_{iii}$ as part of the blockchain 300 all transactions $X_i$, $X_{ii}$, $X_{iii} \rightarrow X_n$. Alternately, the security exchange 110 can provide individual blockchains 300 for each user 10.

Figure 7:
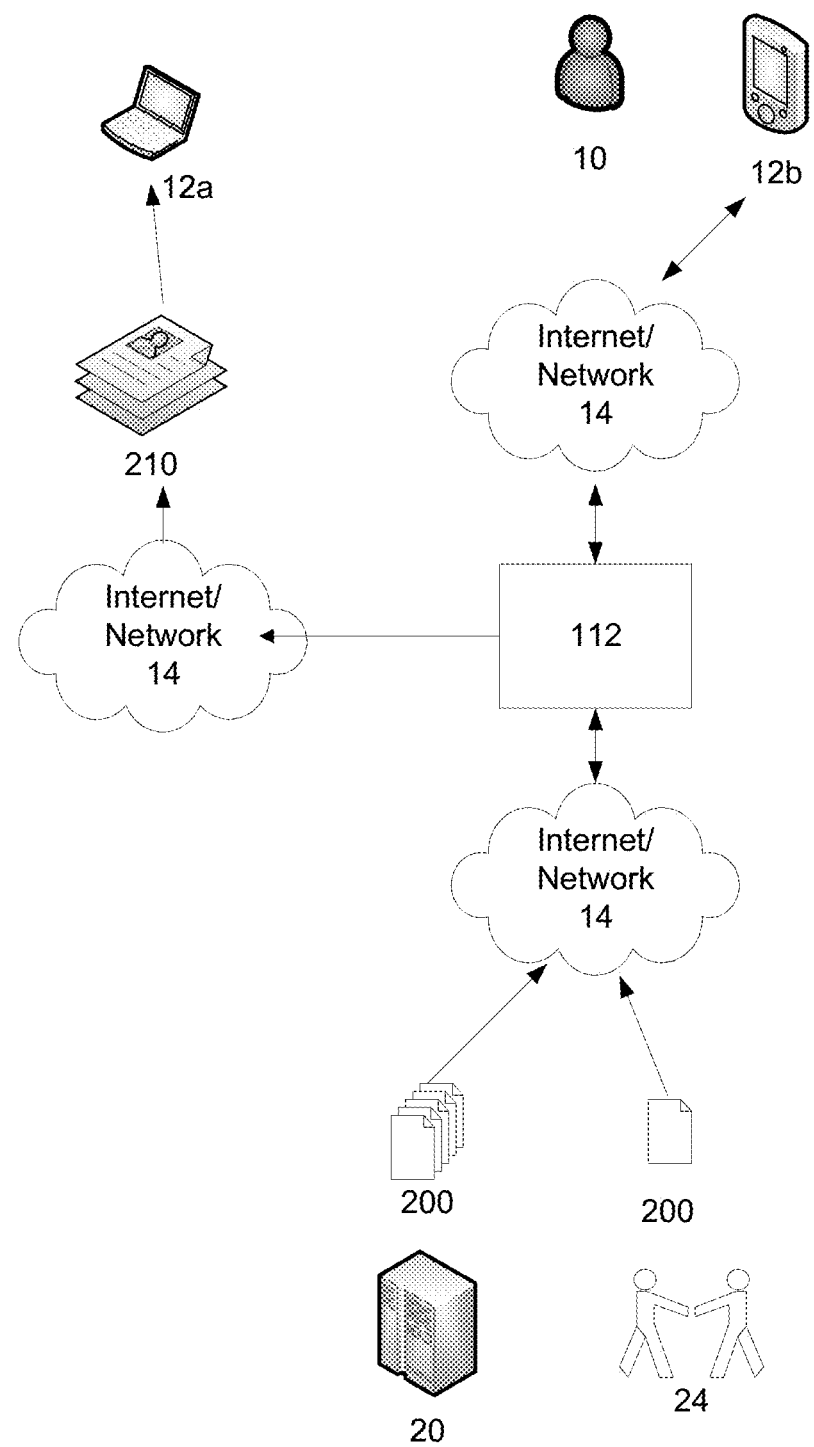
FIG. 7 illustrates an example of the display engine.

FIG. 7 illustrates an example of the display engine 112. The display engine 112, in an example, can stream and synchronize data 200 (e.g. photos, audio, video, documents, social media, email) from connected devices 12, content 16, and service 18, and transcode the file formats (transcoded data 210) for seamless display on all devices 12. In an example, if the user asks for images from Italy, the display engine 112 can format the JPEG images and MP4 files to be played back-to-back and converted to play using the software on the particular device requested. For example, the MP4 file may be converted to QuickTime (MOV) to play on an Apple device, even though that particular piece of data was originally recorded using an Android based device. Thus, the user 10 can make the request from her smartphone 12b, and at the end of all the processing by the other elements 102, 104, 106, 108, 110 of the system 100, the display engine can pull the requested data 200 from file storage 20 and social media 24, assemble it, transcode it for the user's laptop 12a and send the transcoded data 210 for display.

Turning back to the system 100 as a whole, one or more aspects of the engines 102, 106, 108 and the exchange 110 can reside on the user devices 12 while the memory 104 and other aspects of the engines 102, 106, 108, 112 and the exchange 110 can reside either on a single server or distributed through cloud computing and storage. A decentralized computing example can have the benefit of quicker response time and the ability to leverage additional computing power and storage quickly.

The engines 102, 106, 108, 112 and the exchange 110 can be software implemented on general purpose or specifically designed hardware or processors. Each of the parts 102, 104, 106, 108, 110, 112 of the system 100 can also be distributed over a network. In one example, the scanning engine 102 can be numerous different algorithms on numerous different platforms. Thus, data 200 that comprises both text and images can be processed twice, once through the text analyzer and a second time through the image analyzer. This allows both mediums to have optimal processing.

The scanning engine 102, along with scanning the user's devices 12, content 16, and services 18 can also acquire information regarding the user's profile attached with each of the devices 12 and services 18. This allows for more personalized data 208 to be provided to the analysis engine 106. The scanning engine 102 can also track the user's 10 interactions with each of the devices 12, content 16, and services 18. For example, that the user 10 typically access her social media sites 24 from her smartphone 12b but accesses e-mail primarily from her laptop 12a. These trends can also be passed to the analysis engine 106 to be added to the correlated metadata 206 and be of use to optimize the search engine 108. For example, a search for data noted to be likely found in an e-mail can be optimized by looking first at data created on the laptop 12a.

The addition of information to the scanning engine 102 can be user 10 prompted. A user 10 can be asked to provide particular data to help streamline searches and the creation of metadata. For example, the user 10 can be asked to upload/identify photos of particular people so only those individuals are tagged during analysis. This eases the load on the storage 104 and/or the analysis engine 106 with maintaining a smaller set of critical data. The user 10 can also be asked for "topics of interest" and/or "favorite activities" for the scanning/analysis engines 102, 106 to tag. This way, a user 10 can provide priority to the search and analysis to provide more relevant results and optimize the system 100. For example, a user 10 can have 100's of photos, and instead of the system 100 trying to identify every face in every photo, it can focus in on just the images identified by the user 10. This can speed up the processing of the data. Other examples can just give priority to the user's 10 choices so that information is extracted first, but then the system 100 can make a second pass to extract the remaining information when system resources are available.

As data 200 is constantly changing, the scanning engine 102 is constantly updating the metadata 202, 204 it provides to storage 104 and/or the analysis engine 106. The scanning engine 102 can also monitor which device 12 the user 10 is using at any one time and which devices 12 are registered to the user 10. That information can be provided to the system 100 to permit seamless delivery of data 200 to the user 10.

The scanning engine 102 can be one or more algorithms designed to analyze user data 200. Specialized algorithms can be designed for each type of data 200. Photo analysis and image recognition can be performed by one algorithm while text analysis for words and context can be done by another. These scanning modules of the scanning engine 102 can then be upgraded, debugged, and replaced without disturbing the other aspects of the scanning engine 102.

The storage/memory 104 is non-transient and can be of the type known to those of skill in the art, e.g., magnetic, solid state or optical. The storage 104 can be centralized in a server or decentralized in a cloud storage configuration. The metadata 202, 204 and/or correlated metadata 206 can be stored in a database. In one example, each user 10 can have a record or entry in the database. A user's entry is ever expanding as she generates more and more data 200 to reticulate and extract from. The correlated metadata 206 can be expanded as the user 10 also engages additional services 18. The user entry can be updated in real time, providing a constantly up-to-date profile of the user 10 and her digital footprint, allowing the system 100 to more easily provide results to the questions/requests posed to the search engine 108.

The analysis engine 106 can also be a combination of algorithms or individual services that sort and analyze the metadata 202, 204, 208 and creates the correlated metadata 206. The correlated metadata 206 can be metadata not already generated from the service metadata 202a, the user metadata 202b and the personalize metadata 208. The correlated metadata 206 can include very specific details gleaned from the data 200 or relationships between the metadata 202, 204, 208 that no one set of metadata 202, 204, 208 had captured.

For example, Word, while generating document metadata 202a cannot correlate that data with images posted on Facebook and music listened to on Pandora. The analysis engine 106 can determine that after the user's trip to Italy, she developed a taste for opera. Facebook may have the images of the opera house, Outlook may have the calendar entry for the user's first opera, and Pandora may note that the user is now listening to opera streams, but the analysis engine 106 assembles the pieces to determine that the user 10 started to appreciate opera only after her trip. This analysis happens across all of the user's data.

In additional examples, the correlated metadata 206 can include data groupings. The data groupings are information that relates like files over one or more dimensions. The groupings can relate to a single event, like a trip to Italy, or even more specific to just the churches visited in Italy, or churches visited throughout Europe over may trips to different cities. The same data 200 can be in many different groupings, if the content dictates. The groupings can be formed from data 200 residing on any device 12, content 16, or service 18. The similarities between related data 200 are gleaned from the correlated metadata 206. The analysis for correlated metadata 206 can get as granular as sentiment/emotional state in the writings and images. Smiles, frowns, clipped tones, laughs, and inflections can be used to determine basic emotional states and that can be added to the correlated metadata 206.

Figure 8:
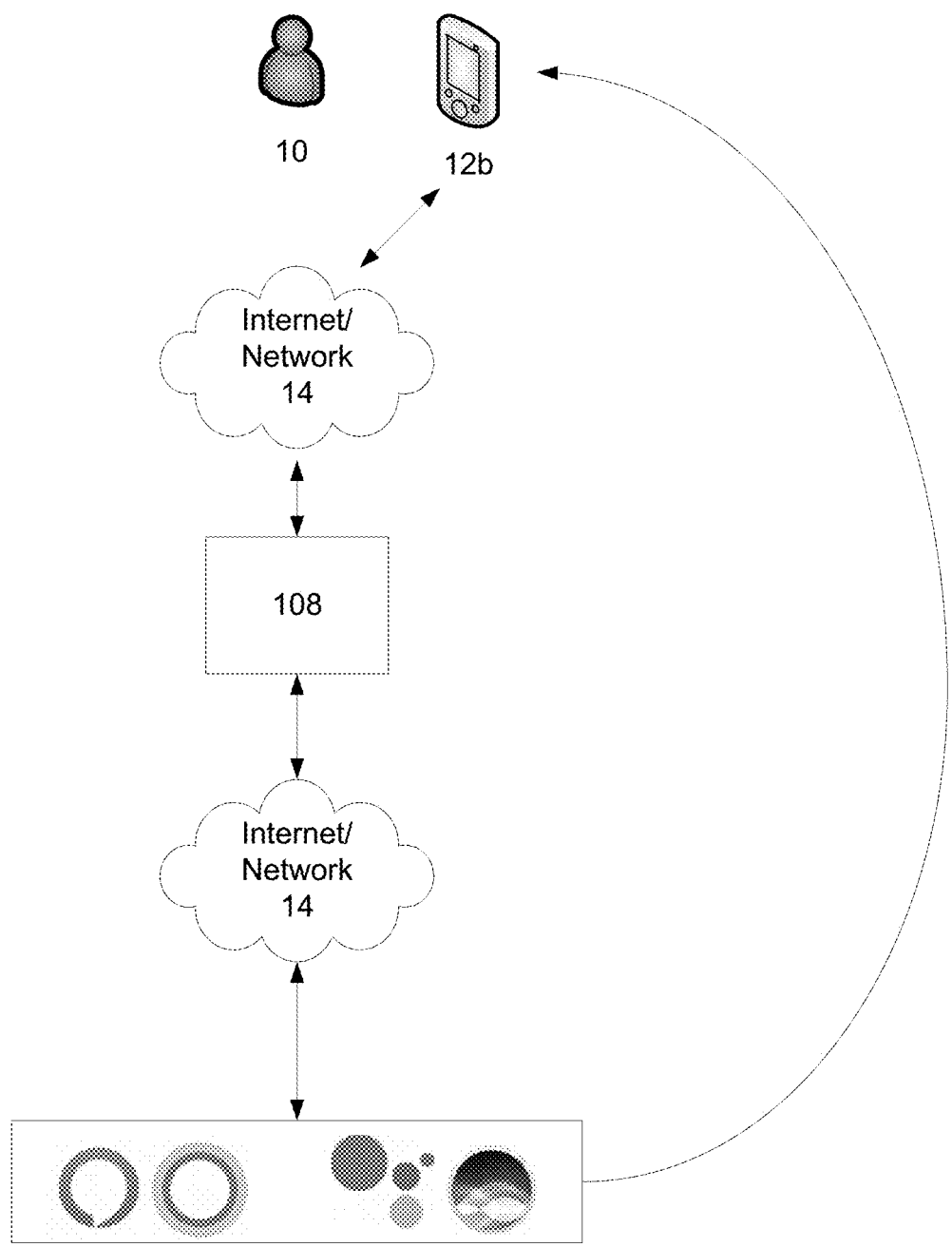
FIG. 8 illustrates an example of the system interfacing with digital assistants.

The search engine 108 can use natural language processing to search the user data 200 linked to the service 100, in most or all the native world languages of the user 10. In addition, the search engine 108 can interface across platforms with other digital assistants 400 (e.g. Alexa, Cortana, Siri, Google Assistant, etc.) to leverage the search features built into the digital assistants. Different digital assistants 400 perform and are optimized for different search and query functions. Certain digital assistants 400 are optimized for ecommerce, device and OS operations, fact retrieval, etc. and the search engine 108 can expand the results of a user 10 inquiry. For example, the analysis engine 106 determined the user 10 is interested in opera. The search engine 108 can query an ecommerce digital assistant for books, videos and audio recordings, the fact assistant for time, date, and location of the next operatic performance near the user 10, and the OS assistant to add the feature to the user's calendar and provide directions to the performance. The results from the digital assistant 400 can be directed back through the search engine 108 or reported directly from the digital assistant 400 to the user 10, as in illustrated in FIG. 8.

Figure 9:
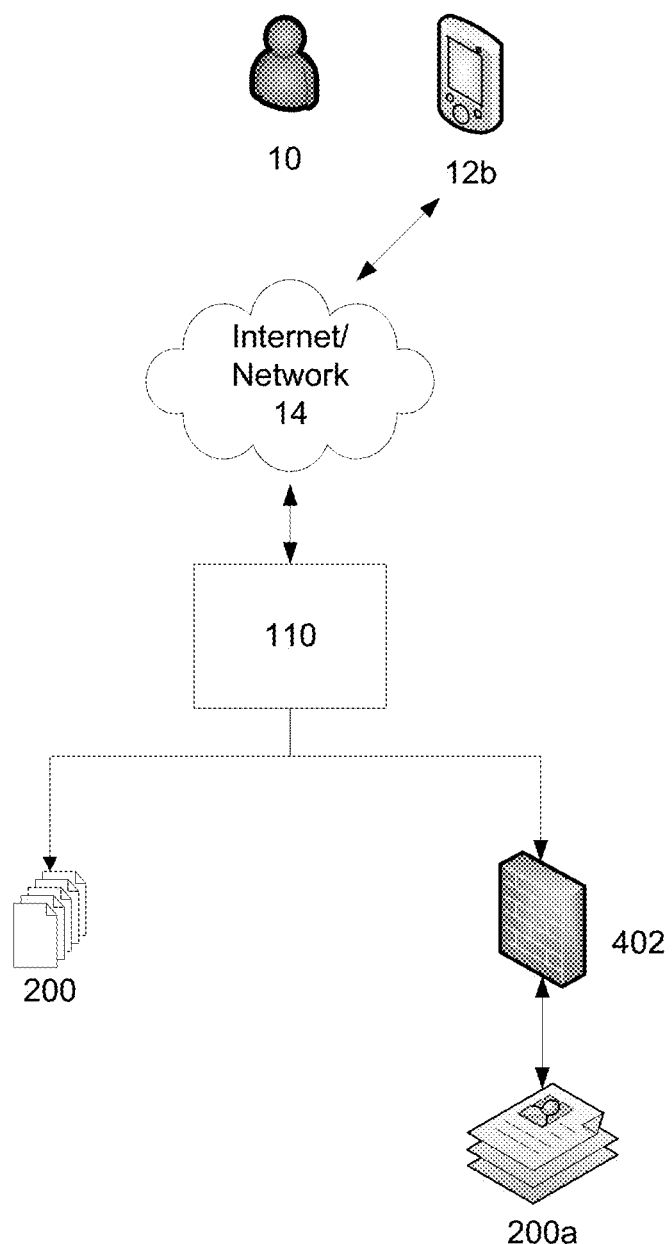
FIG. 9 illustrates an example of heightened security protecting patient data.

Turning back to the security exchange 110, this feature can secure the user data 200 and the resulting correlated metadata 206 to particular security standards, for example, pursuant to HIPAA ("Health Insurance Portability and Accountability Act") standards. This can require the user 10 to enter a PIN to access certain data and/or other security features, including voice and facial recognition and two-factor authentication. The analysis engine 106 can determine sensitive patient data 200a from the entirety of the user data 200 and have the security exchange 110 add additional levels of security 402. The additional levels of security can include using higher grade encryption for the sensitive patient data 200a, excluding sensitive patient data 200a from the search results without security verification, and providing the user 10 with a warning that data 200 she wants to transmit or post contains sensitive patient data 200a. FIG. 9 illustrates this concept.

The system 100 is robust to operate with all or most devices 12 and services 18. Table 1 is a partial list of the devices 12 and services 18 that the system 100 can currently interact with.

TABLE 1

| Collaboration | File Sharing | Content Sharing | Social Media | IoT Devices |
|---|---|---|---|---|
| Asna | Amazon Cloud Drive | Dailymotion | Facebook | Amazon Echo |
| Bitbucket | Box | DeviantArt | Foursquare | Amazon Fire |
| Evernote | Dropbox | Flickr | Google Hangouts | Android Smartphones |
| GoToMeeting | Google Drive | Imgur | | Android Tablets |
| GitHub | Microsoft OneDrive | Instagram | LinkedIn | Android Smart TVs |
| Gmail | | Pandora Radio | Messenger | Android Wearables |
| Google Docs | | Photobucket | Twitter | Android Smart Speakers |
| Microsoft Teams | | Picasa | Tumblr | iPhone |
| Office 365 | | Pinterest | | iPad |
| Outlook Mail | | Soundcloud | | HomePod |
| Salesforce | | Spotify | | Apple TV |
| SharePoint Online | | Vimeo | | Apple Watch |
| Skype | | Xbox Live | | Mac Computers |
| Slack | | YouTube | | Win 10 PCs |
| Slideshare | | | | Win 10 Tablets |
| Trello | | | | Win 10 Smartphones |
| WebEx | | | | Xbox One |
| Yammer | | | | Win 10 Wearables |

Figure 10:
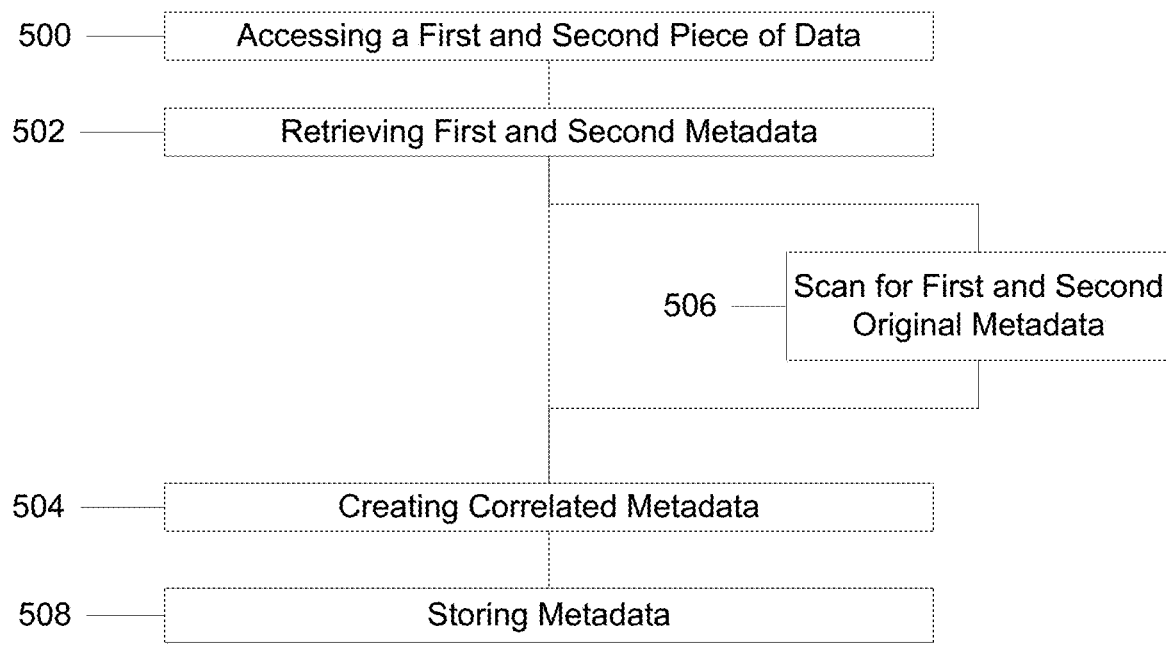
FIG. 10 illustrates an example of a method of created correlated metadata.

The system 100 above is designed to implement a number of methods using processors and algorithms as illustrated in FIG. 10. The scanning engine 102 can access, in some examples for an individual user, over the network 14, a first piece of data 200' stored at a first location and a second piece of data $200_{ii}$ stored at a second location (step 500). The scanning engine further retrieves from the first and second pieces of data $200_i$, $200_{ii}$ a first metadata $202_i$ and second metadata $202_{ii}$ related respectively (step 502). The analysis engine 106 creates the correlated metadata 206 based on the first metadata 2021 and the second metadata $202_{ii}$ (step 504). An example of the correlated metadata 206 contains information not present in the first metadata and the second metadata and the information is based on an analysis of the first metadata and the second metadata. In this instance, "not present" is excluding any information already present in the metadata 202, 208 and any formalities that do not require analysis, like a time and date stamp.

As noted above, the metadata can encompass service metadata 202a, user metadata 202b and personalized metadata 208. The service and user metadata 202a, 202b is appended to the data 200. In certain examples, the service and user metadata 202a, 202b is all the system 100 uses for the analysis. However, in other examples, the scanning engine 102 can scan the first piece of data $200_i$ to generate a first original metadata $204_i$ and scan the second data $200_{ii}$ to generate a second original metadata $204_{ii}$ (step 506). The metadata $202_i$, $202_{ii}$, $204_i$, $204_{ii}$, 206, 208 can be stored in memory 104 (step 508), which in this example is separate from the first location and the second location. Alternately, just the original metadata 204 can be used for correlation.

Figure 11:
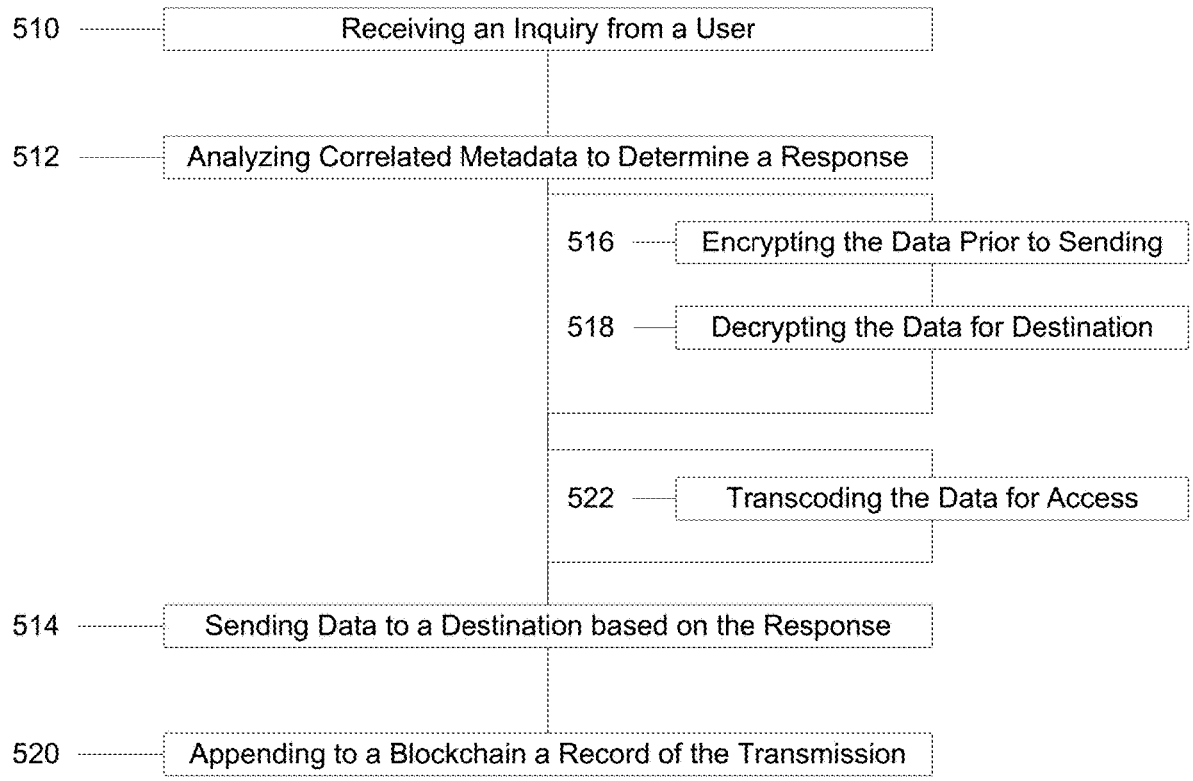
FIG. 11 illustrates an example of a method of responding to a user inquiry.

FIG. 11 illustrates that the search engine 108 can receive from the user 10, an inquiry related to at least one of the first and second pieces of data (step 510). The analysis engine 106 can analyze, using a processor running instructions to implement at least one algorithm, the correlated metadata 206 to determine a response to the inquiry (step 512). The search engine 108 and/or the display engine 112 can send to a destination, based on the response, the first and/or second piece of data from where they were stored or send a first and/or second link to the respective data (step 514). The destination above can be any "location" the user 10 specifies. It can be to move the data 200 from one device 12 or service 18 to another, send the data 200 to the device 12 the user 10 is currently using, or transmit the data 200 to a third-person via file transfer, email, text, etc.

In other examples, the security exchange 110 can encrypt the data 200 prior to sending it to the destination (step 516) and then decrypt it once delivered to the destination (step 518). One example of decryption is that the security exchange 110 performs the decryption at the destination to the file is unencrypted at the destination without the recipient taking action. In an alternate example, the "decryption" is a follow-on communication that allows the recipient to decrypt the data when wanted.

Another feature that can be used both with and without the encryption is tracking the data with blockchain technology. The security exchange 110 can append to a blockchain a record of the data being sent (step 520). Other examples of the display engine 112 can transcode the data 200, either prior to the destination or once delivered to the destination, to permit the destination to access the data 200 (step 522). This allows data 200 in multiple formats to be delivered in a uniform format or have their format changed to permit access on the device the data is delivered to.

Figure 12:
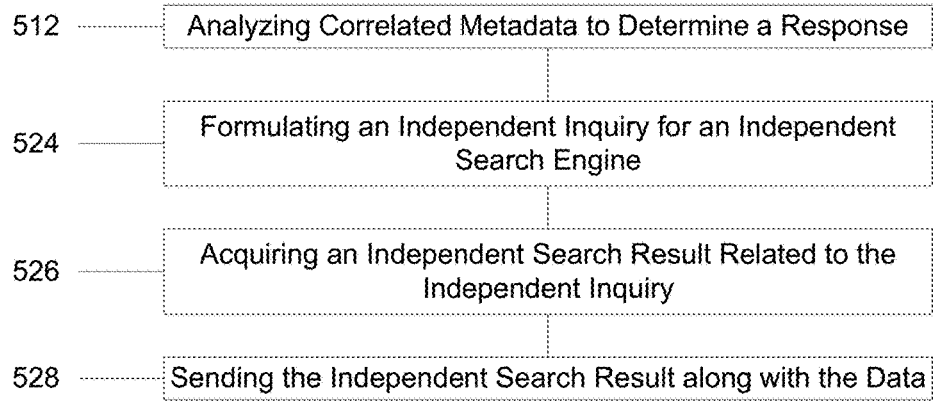
FIG. 12 illustrates a method of inquiring an independent search engine.

In other examples in FIG. 12, the search engine 108 and/or the analysis engine 106 can, while determining the answer based on the correlated metadata 206, formulate an independent inquiry to an independent search engine (step 524) and then acquire from the independent search engine an independent search result related to the independent inquiry (step 526). Then, when sending the data 200 to the destination, the independent search result can be sent along with the data 200 (step 528).

It must also be noted that, as used in the specification and the appended claims, the singular forms "a," "an" and "the" include plural referents unless the context clearly dictates otherwise. By "comprising" or "containing" or "including" is meant that at least the named component or method step is present in the article or method, but does not exclude the presence of other components or method steps, even if the other such components or method steps have the same function as what is named.

It is also understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

The design and functionality described in this application is intended to be exemplary in nature and is not intended to limit the instant disclosure in any way. Those having ordinary skill in the art will appreciate that the teachings of the disclosure may be implemented in a variety of suitable forms, including those forms disclosed herein and additional forms known to those having ordinary skill in the art.

Certain examples of this technology are described above with reference to flow diagrams. Some blocks of the block diagrams and flow diagrams may not necessarily need to be performed in the order presented, or may not necessarily need to be performed at all, according to some examples of the disclosure.

While certain examples of this disclosure have been described in connection with what is presently considered to be the most practical and various examples, it is to be understood that this disclosure is not to be limited to the disclosed examples, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain examples of the technology and also to enable any person skilled in the art to practice certain examples of this technology, including making and using any apparatuses or systems and performing any incorporated methods. The patentable scope of certain examples of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of creating new metadata from existing metadata, comprising the steps of:

for an individual user having a first user account at a first location and a second user account at a second location, linking to the first user account and the second user account to allow access to the first user account and the second user account, wherein the first location is a first online service and the second location is a second online service;

accessing, over a network, a first piece of data stored at the first location in association with the first user account and a second piece of data stored at the second location in association with the second user account, wherein the first piece of data and the second piece of data are different types of data having different sets of metadata attributes;

retrieving, from the first piece of data, a first metadata related to the first piece of data;

retrieving, from the second piece of data, a second metadata related to the second piece of data;

creating, using a processor, a correlated metadata based on the first metadata and the second metadata, wherein the correlated metadata links the first piece of data to the second piece of data and wherein the correlated metadata comprises:

information that is not included in the first metadata and not included in the second metadata, and the information is based on an analysis of the first metadata and the second metadata;

associating the correlated metadata with the first metadata related to the first piece of data and with the second metadata related to the second piece of data; and processing a search inquiry to locate responsive data across multiple different online services, processing the search inquiry comprising:

analyzing, using the processor, the correlated metadata to identify the first piece of data and the second piece of data as responsive to the search inquiry; and generating a response to the search inquiry, the response to the search inquiry identifying or including the first piece of data and the second piece of data.

2. The method of claim 1, wherein the first metadata is appended to the first piece of data; and wherein the second metadata is appended to the second piece of data.

3. The method of claim 2, further comprising :

scanning, using the processor, the first piece of data to generate a first original metadata;

scanning, using the processor, the second piece of data to generate a second original metadata; and adding, to the correlated metadata, original information based on the analysis of the first original metadata and the second original metadata.

4. The method of claim 1, wherein retrieving from the first piece of data, the first metadata related to the first piece of data comprises scanning, using the processor, the first piece of data to generate the first metadata; and wherein retrieving, from the second piece of data, the second metadata related to the second piece of data comprises scanning, using the processor, the second piece of data to generate the second metadata.

5. The method of claim 1, further comprising the step of:

storing, in a non-transient memory:
the first metadata and the second metadata, either before or after the creating step; and
the correlated metadata,
wherein the non-transient memory is separate from the first location and the second location.

6. The method of claim 1, further comprising:

sending the response to the search inquiry to a destination, the response including the first piece of data from the first location and the second piece of data from the second location, wherein the search inquiry is received from a user.

7. The method of claim 6, wherein the sending step further comprises the steps of:

encrypting, using the processor, at least one of the first piece of data from the first location or the second piece of data from the second location prior to sending to the destination;

decrypting, using the processor, the at least one of the first piece of data or the second piece of data once delivered to the destination; and appending, to a blockchain, a record of the sending step.

8. The method of claim 6, wherein the sending step further comprises the step of:

transcoding at least one of the first piece of data or the second piece of data, at least one of prior to the destination or once delivered to the destination, to permit the destination to access the at least one of the first piece of data or the second piece of data.

9. The method of claim 6, comprising:

formulating, using the processor, based on the analysis of the correlated metadata, an independent inquiry to an independent search engine;

acquiring, from the independent search engine, an independent search result related to the independent inquiry; and wherein the response comprises the independent search result.

10. A system to create new metadata from existing metadata, comprising:

a scanning engine configured to:
for an individual user having a first user account at a first location and a second user account at a second location, access, over a network, the first user account and the second user account to access a first piece of data stored at the first location in association with the first user account and a second piece of data stored at the second location in association with the second user account, wherein the first location is a first online service and the second location is a second online service, wherein the first piece of data and the second piece of data are different types of data having different sets of metadata attributes; and retrieve, from the first piece of data, a first metadata related to the first piece of data;

retrieve, from the second piece of data, a second metadata related to the second piece of data; and an analysis engine configured to:

generate a correlated metadata based on the first metadata and the second metadata, wherein the correlated metadata links the first piece of data to the second piece of data and wherein the correlated metadata comprises:
information that is not included in the first metadata and not included in the second metadata, and
the information is based on an analysis of the first metadata and the second metadata; and associate the correlated metadata with the first metadata related to the first piece of data and with the second metadata related to the second piece of data; and a search engine configured to:
process a search query to locate responsive data across multiple different online services, processing the search query comprising:
analyzing the correlated metadata to identify the first piece of data and the second piece of data as responsive to the search query based on the correlated metadata; and
generating a response to the search query, the response to the search query identifying or including the first piece of data and the second piece of data.

11. The system of claim 10, further comprising:

a non-transient memory storing the first metadata and the second metadata, either before or after generating the correlated metadata with the analysis engine, and storing the correlated metadata, wherein the non-transient memory is separate from the first location and the second location.

12. The system of claim 10, wherein the search engine is configured to:

receive the search query from a user; and
send the first response to a destination.

13. The system of claim 12, further comprising:

a security exchange configured to:
encrypt at least one of the first piece of data from the first location or the second piece of data from the second location prior to sending to the destination;
decrypt the at least one of the first piece of data or the second piece of data once delivered to the destination; and
append to a blockchain a record of a delivery to the destination.

14. The system of claim 12, further comprising:

a display engine configured to transcode at least one of the first piece of data or the second piece of data, at least one of prior to the destination or once delivered to the destination, to permit the destination to access the at least one of the first piece of data or the second piece of data.

15. The system of claim 12, wherein the search engine further comprises a processor running instructions to implement:

formulating, based on the analysis, an independent inquiry to an independent search engine;

acquiring, from the independent search engine, an independent search result related to the independent inquiry; and wherein the response comprises the independent search result.

16. The method of claim 1, further comprising the steps of:
- receiving the search inquiry from a user;
- analyzing, using the processor, the correlated metadata to determine a response to the inquiry; and
- sending the response to a destination, wherein the response comprises at least one of a first link to the first piece of data or a second link to the second piece of data.

\* \* \* \* \*